(12) United States Patent
Kumashiro

(10) Patent No.: US 12,435,758 B2
(45) Date of Patent: Oct. 7, 2025

(54) BEARING UNIT AND MOTOR

(71) Applicant: Panasonic Intellectual Property Management Co., Ltd., Osaka (JP)

(72) Inventor: Masatomo Kumashiro, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 78 days.

(21) Appl. No.: 18/572,254

(22) PCT Filed: May 27, 2022

(86) PCT No.: PCT/JP2022/021827
§ 371 (c)(1),
(2) Date: Dec. 20, 2023

(87) PCT Pub. No.: WO2023/276515
PCT Pub. Date: Jan. 5, 2023

(65) Prior Publication Data
US 2024/0229862 A1    Jul. 11, 2024

(30) Foreign Application Priority Data
Jul. 1, 2021 (JP) .................................. 2021-109788

(51) Int. Cl.
*F16C 27/02* (2006.01)
*F16C 33/66* (2006.01)
(Continued)

(52) U.S. Cl.
CPC .......... *F16C 27/02* (2013.01); *F16C 33/6648* (2013.01); *F16C 35/02* (2013.01);
(Continued)

(58) Field of Classification Search
CPC ...... F16C 27/02; F16C 35/02; F16C 33/6648; F16C 2360/48; F16C 2380/26; H02K 5/1672; H02K 7/083
See application file for complete search history.

(56) References Cited

U.S. PATENT DOCUMENTS 4,355,250 A * 10/1982 Langdon .............. H02K 5/1672
310/90
4,634,298 A * 1/1987 Crawford ............. H02K 5/1672
384/209
(Continued)

FOREIGN PATENT DOCUMENTS

FR    2377723 A1 *  8/1978
JP   56-088642        7/1981
(Continued)

OTHER PUBLICATIONS

International Search Report of PCT application No. PCT/JP2022/021827 dated Jul. 26, 2022.

*Primary Examiner* — Phillip A Johnson
(74) *Attorney, Agent, or Firm* — Rimon P.C.

(57) ABSTRACT

A bearing unit that supports a rotating shaft includes: a frame including a tubular body; a bearing disposed in the frame; and a pressing spring that is disposed in the frame and presses the bearing, the pressing spring including a protrusion as a positioning part that comes into contact with an inner surface of the tubular body of the frame to determine a position of the pressing spring.

8 Claims, 8 Drawing Sheets

(51) Int. Cl.
  *F16C 35/02*   (2006.01)
  *H02K 5/167*   (2006.01)
  *H02K 7/08*    (2006.01)

(52) U.S. Cl.
  CPC ........... *H02K 5/1672* (2013.01); *H02K 7/083* (2013.01); *F16C 2360/46* (2013.01); *F16C 2380/26* (2013.01)

(56) References Cited

U.S. PATENT DOCUMENTS

| | | | |
|---|---|---|---|
| 4,806,025 A * | 2/1989 | Kamiyama | F16F 1/324 |
| | | | 310/90 |
| 2005/0018935 A1* | 1/2005 | Simpson | H02K 5/1672 |
| | | | 310/90 |
| 2005/0041897 A1* | 2/2005 | Borcherding | F16C 23/046 |
| | | | 384/192 |

FOREIGN PATENT DOCUMENTS

| | | |
|---|---|---|
| JP | 62-118727 | 5/1987 |
| JP | 01-144341 | 6/1989 |
| JP | 01-131270 U | 9/1989 |
| JP | 02-051714 U | 4/1990 |
| JP | 2010-035267 | 2/2010 |

\* cited by examiner

BEARING UNIT AND MOTOR

CROSS-REFERENCE TO RELATED APPLICATIONS

This application is a U.S. national stage application of the PCT International Application No. PCT/JP2022/021827 filed on May 27, 2022, which claims the benefit of foreign priority of Japanese patent application 2021-109788 filed on Jul. 1, 2021, the contents all of which are incorporated herein by reference.

TECHNICAL FIELD

The present disclosure relates to a bearing unit of a motor, and a motor including a bearing unit.

BACKGROUND ART

Motors are used in home electric apparatuses and other electric apparatuses in various fields. For example, a motor is used as a fan motor of a blower mounted on a refrigerator.

A motor includes a stator, a rotor that rotates by a magnetic force of the stator, and a bearing that supports a rotating shaft of the rotor. In this case, being combined with other components, the bearing may be configured as a bearing unit (see PTL 1).

Conventionally, a bearing unit using a sliding bearing as a bearing has been known. For example, as this type of bearing unit, there has been proposed a bearing unit including a frame, a bearing disposed in the frame, a pressing spring that holds the bearing, and a frame cover disposed at an opening of the frame so as to cover the pressing spring.

In thus configured bearing unit, the bearing is elastically held by placing the pressing spring on an upper part of the bearing and pressing the bearing with a spring elastic force of the pressing spring. In this case, the bearing is pressed by the pressing spring in a state where the bearing can be automatically aligned.

However, in a configuration of the conventional bearing unit, at the time of assembly of the bearing unit, the pressing spring may be placed on the bearing with a deviation from a predetermined position, and the bearing unit may be assembled while the pressing spring remains deviated. In this case, a direction of pressing the bearing by the pressing spring may deviate from a desired direction, and the bearing may fail to exhibit an alignment function.

In particular, since when the bearing is downsized, the pressing spring becomes unstable on the bearing, it is more difficult to place the pressing spring at a correct position on the upper part of the bearing, causing the pressing spring to be easily deviated in position.

CITATION LIST

Patent Literature

PTL 1: Unexamined Japanese Patent Publication No. 2010-35267

SUMMARY

The present disclosure has been made to solve such problems. An object of the present disclosure is to provide a bearing unit in which a pressing spring that presses a bearing can be easily disposed at a predetermined position, and a motor.

In order to achieve the above object, one aspect of a bearing unit according to the present disclosure is a bearing unit that supports a rotating shaft, and includes: a frame including a tubular body; a bearing disposed in the frame; and a pressing spring that is disposed in the frame and presses the bearing, the pressing spring including a positioning part that comes into contact with an inner surface of the tubular body to determine a position of the pressing spring.

One aspect of a motor according to the present disclosure includes the above bearing unit and a rotating shaft supported by the bearing unit.

In the bearing unit, the pressing spring can be easily disposed at a predetermined position. Therefore, it is possible to suppress the bearing from failing to exhibit an alignment function.

DESCRIPTION OF PREFERRED EMBODIMENTS

In the following, exemplary embodiments of the present disclosure will be described with reference to the drawings. The exemplary embodiments described below each illustrate one specific example of the present disclosure. Consequently, numerical values, shapes, materials, constituent elements, layout positions and connection modes of the constituent elements, and the like illustrated in the following exemplary embodiments are each merely one example, and are not intended to limit the present disclosure. Accordingly, among the constituent elements in the exemplary embodiments below, those not described in an independent claim will be described as optional constituent elements.

Note that each of the drawings is a schematic view and not necessarily illustrated strictly. In each drawing, a substantially identical configuration to other drawing is denoted by the same reference sign and repetitive explanation thereof will be omitted or simplified. Furthermore, in the present description, the terms "upper" and "lower" do not necessarily refer to an upward direction (vertically upward) and a downward direction (vertically downward) in terms of absolute space recognition.

Exemplary Embodiment

Figure 1:
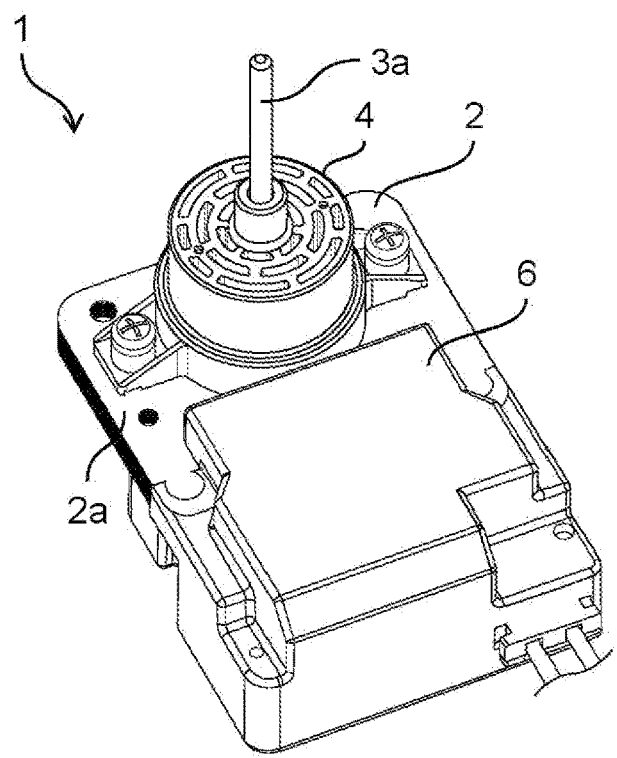
FIG. 1 is an external perspective view of a motor according to an exemplary embodiment when viewed from one side.
Figure 2:
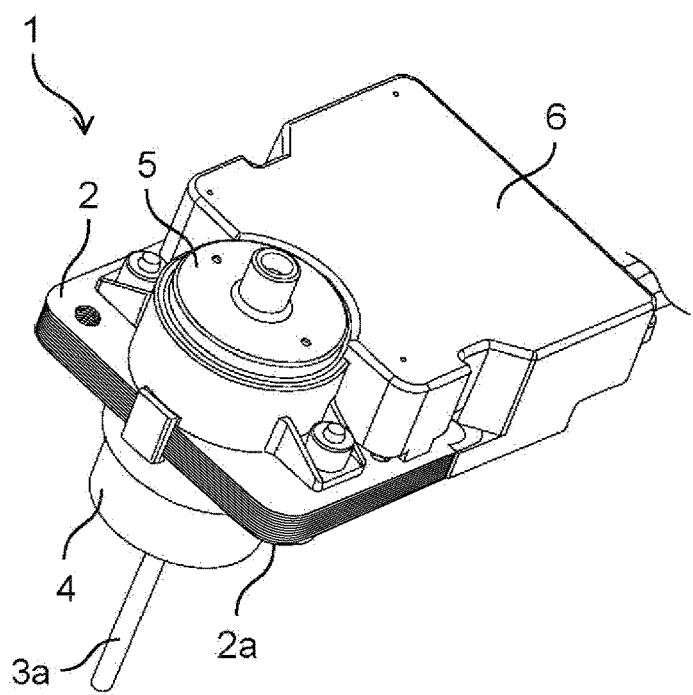
FIG. 2 is an external perspective view of the motor according to the exemplary embodiment when viewed from the other side.
Figure 3:
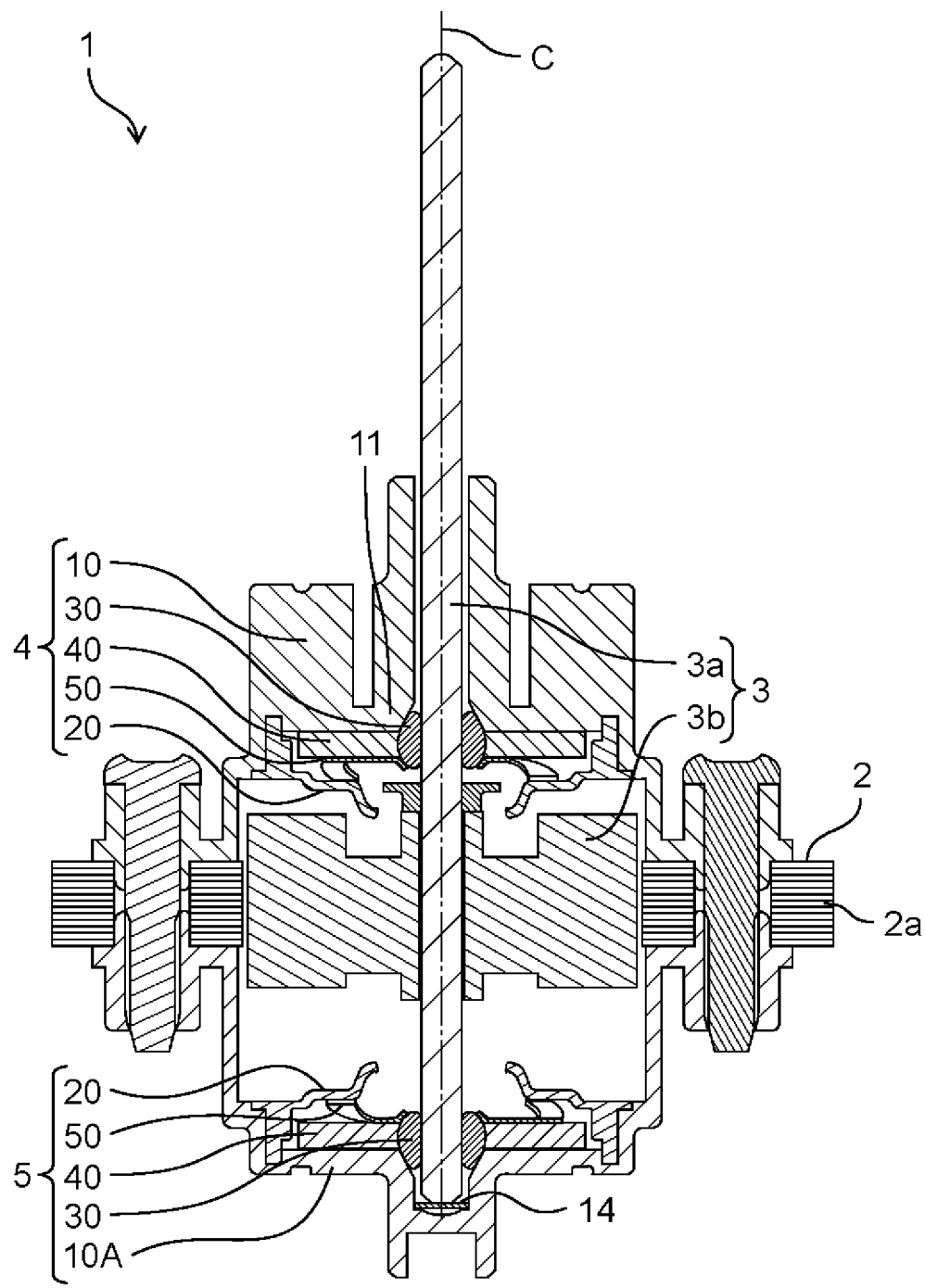
FIG. 3 is a cross-sectional view of the motor according to the exemplary embodiment.

An overall configuration of motor 1 according to an exemplary embodiment will be described with reference to FIGS. 1 to 3. FIG. 1 is an external perspective view of motor 1 according to the exemplary embodiment when viewed from one side. FIG. 2 is an external perspective view of motor 1 when viewed from the other side. FIG. 3 is a cross-sectional view of motor 1.

As illustrated in FIGS. 1 to 3, motor 1 includes stator 2, rotor 3 having rotating shaft 3a, first bearing unit 4 and second bearing unit 5 that support rotating shaft 3a, and mold resin 6.

Motor 1 in the present exemplary embodiment can be used as a fan motor in a blower. Such a blower can be used in an electric apparatus such as a refrigerator, an air conditioner or the like, for example. For example, in a refrigerator, a blower (indoor fan) is used for circulating cold air.

Stator 2 (stator) generates a magnetic force that acts on rotor 3 to rotate rotor 3. As illustrated in FIG. 3, stator 2 is disposed to be opposed to rotor 3 with a minute air gap interposed between the stator and rotor 3.

Stator 2 includes stator core 2a and a coil (not illustrated) fixed to stator core 2a.

Stator core 2a (stator iron core) is a laminate in which a plurality of electromagnetic steel sheets are laminated along a direction of shaft center C in which rotating shaft 3a extends. Note that stator core 2a is not limited to a laminate, and may be a bulk body made of a magnetic material. The coil is a winding coil which is wound around stator core 2a. Specifically, the coil is wound around a predetermined part of stator core 2a via a bobbin that is an insulating frame. The coil is covered with mold resin 6.

When a current flows through the coil wound around stator core 2a, stator core 2a generates a magnetic force acting on rotor 3. Specifically, stator core 2a generates a magnetic flux on a surface of an air gap from rotor 3 so that N poles and S poles are alternately present along a rotation direction (circumferential direction) of rotating shaft 3a. A direction of a main magnetic flux generated by stator core 2a is a direction (radial direction) orthogonal to shaft center C of rotating shaft 3a.

Rotor 3 (rotor) illustrated in FIG. 3 is disposed rotatably with respect to stator 2. Rotor 3 rotates by a magnetic force generated by stator 2. Specifically, rotor 3 has rotating shaft 3a, and rotates about shaft center C of rotating shaft 3a as a rotation center. Thrust receiving plate 14 supports rotating shaft 3a in a manner of enabling rotating shaft 3a to stably rotate.

Rotor 3 is disposed to be opposed to stator 2. Rotor 3 is opposed to stator core 2a in the direction (radial direction) orthogonal to the direction of shaft center C included in rotating shaft 3a. Rotor 3 is surrounded by stator core 2a.

Rotor 3 includes rotating shaft 3a, and rotor body 3b as a mold of a magnet material in a cylinder shape.

Rotating shaft 3a is a shaft including shaft center C. Rotating shaft 3a is an elongated rod-shaped member such as a metal rod. Shaft center C of rotating shaft 3a is a center when rotor 3 rotates. A longitudinal direction (extending direction) of rotating shaft 3a is a direction (axial direction) in which shaft center C extends.

Rotating shaft 3a is fixed to rotor body 3b in a state of penetrating rotor body 3b so as to extend on both sides of rotor body 3b in the direction of shaft center C included in rotating shaft 3a. Specifically, rotating shaft 3a is inserted into a through hole provided at the center of rotor body 3b and fixed to rotor body 3b.

Rotating shaft 3a is rotatably supported by first bearing unit 4 and second bearing unit 5. Specifically, a first part on one side of rotating shaft 3a extending from one side of rotor body 3b is supported by first bearing unit 4. A second part on the other side of rotating shaft 3a extending from the other side of rotor body 3b is supported by second bearing unit 5.

The part on the one side of rotating shaft 3a protrudes from first bearing unit 4. In other words, rotating shaft 3a penetrates first bearing unit 4. The first part of rotating shaft 3a is a part (an output shaft) on an output side of rotating shaft 3a. Thus, a load to be driven by motor 1 is attached to a distal end of the first part of rotating shaft 3a protruding from first bearing unit 4. For example, when motor 1 is used as a fan motor, a rotary fan is attached as a load to the first part of rotating shaft 3a.

On the other hand, the second part on the other side of rotating shaft 3a does not protrude from second bearing unit 5. In other words, in the present exemplary embodiment, the second part of rotating shaft 3a is a part on an anti-output side (an anti-output shaft) of rotating shaft 3a.

Detailed configurations of first bearing unit 4 and second bearing unit 5 will be described later.

Rotor body 3b generates a magnetic force acting on stator 2. Similarly to stator 2, an orientation of a main magnetic flux generated by rotor body 3b is the direction (radial direction) orthogonal to shaft center C included in rotating shaft 3a.

Specifically, rotor body 3b has a configuration in which N poles and S poles are alternately present along a rotation direction thereof. Rotor body 3b is configured to have a set of the N pole and the S pole. Note that rotor body 3b may be configured to have a plurality of sets of the N poles and the S poles.

Rotor body 3b is formed of a plastic compound material containing a magnetic material. Rotor body 3b made of a compound material is fixed to rotating shaft 3a. Rotor body 3b integrated with rotating shaft 3a is magnetized under an environment where a magnetic force is supplied. Therefore, rotor body 3b functions as a plastic magnet.

Alternatively, rotor body 3b is formed of a rotor core (rotor iron core) made of a magnetic material, and a plurality of permanent magnets fixed to the rotor core. The permanent magnets may be embedded in the rotor core, or may be attached to a side surface of the rotor core. For example, in a case where a permanent magnet is embedded in the rotor core, a magnet insertion hole may be formed in the rotor core, and the permanent magnet may be embedded in the magnet insertion hole. The rotor core is a laminate in which a plurality of electromagnetic steel sheets are laminated along the direction of shaft center C included in rotating shaft 3a. The permanent magnet is, for example, a sintered magnet or a bonded magnet.

As illustrated in FIGS. 1 and 2, mold resin 6 covers a part of stator 2. Specifically, mold resin 6 covers a part of the coil and stator core 2a in stator 2. Mold resin 6 also covers a plurality of circuit components and a circuit board on which the plurality of circuit components are mounted. Covering the coil and the plurality of circuit components with mold resin 6 protects the coil and the plurality of circuit components. The coil and the plurality of circuit components are completely covered with mold resin 6. The plurality of circuit components covered with mold resin 6 controls an energization state of the coil in stator 2. A connector to be connected to an external power supply is also mounted on the circuit board.

Mold resin 6 is a resin molded body which is molded in a predetermined shape. Mold resin 6 is formed using an insulating resin material. Specifically, as mold resin 6, a thermosetting resin or a thermoplastic resin can be used. In this case, as the thermosetting resin, for example, an unsaturated polyester-based resin, a phenol-based resin, an epoxy-based resin or the like can be used. As the thermoplastic resin, for example, a polyethylene terephthalate-based resin, a polybutylene terephthalate-based resin or the like can be used. In thus configured motor 1, when the coil in stator 2 is energized by the plurality of circuit components mounted on the circuit board, a field current flows through the coil, and a magnetic flux is generated in stator 2 (stator core 2a). Then, a magnetic force generated by an interaction between a magnetic flux generated by stator 2 and a magnetic flux generated by rotor 3 becomes a torque that causes rotor 3 to rotate. As a result, rotor 3 rotates.

Next, detailed configurations of first bearing unit 4 and second bearing unit 5 will be described. First, while referring to FIG. 3, the configuration of first bearing unit 4 will be described with reference to FIGS. 4 to 9.

Figure 4:
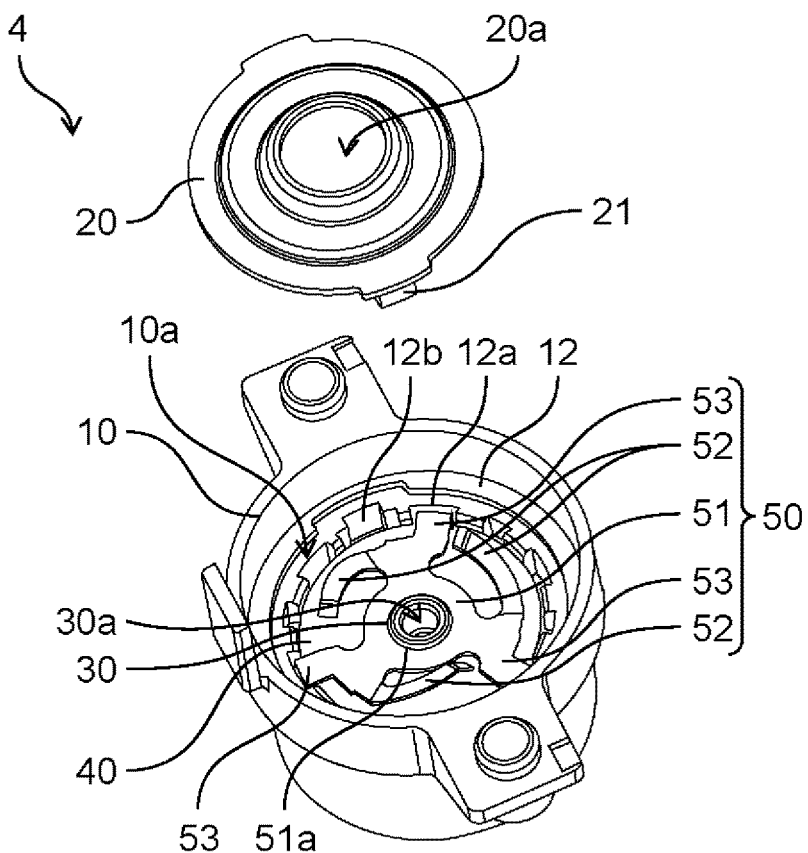
FIG. 4 is a perspective view of a first bearing unit according to the exemplary embodiment in a state where a frame cover is removed.
Figure 5:
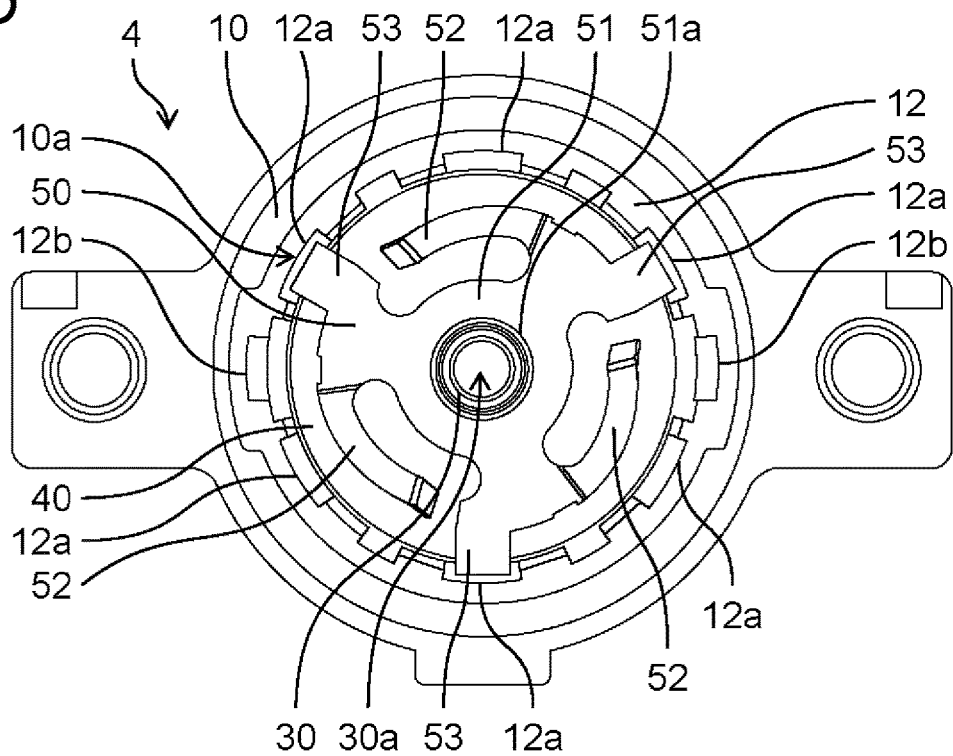
FIG. 5 is a top view of the first bearing unit according to the exemplary embodiment in the state where the frame cover is removed.
Figure 6:
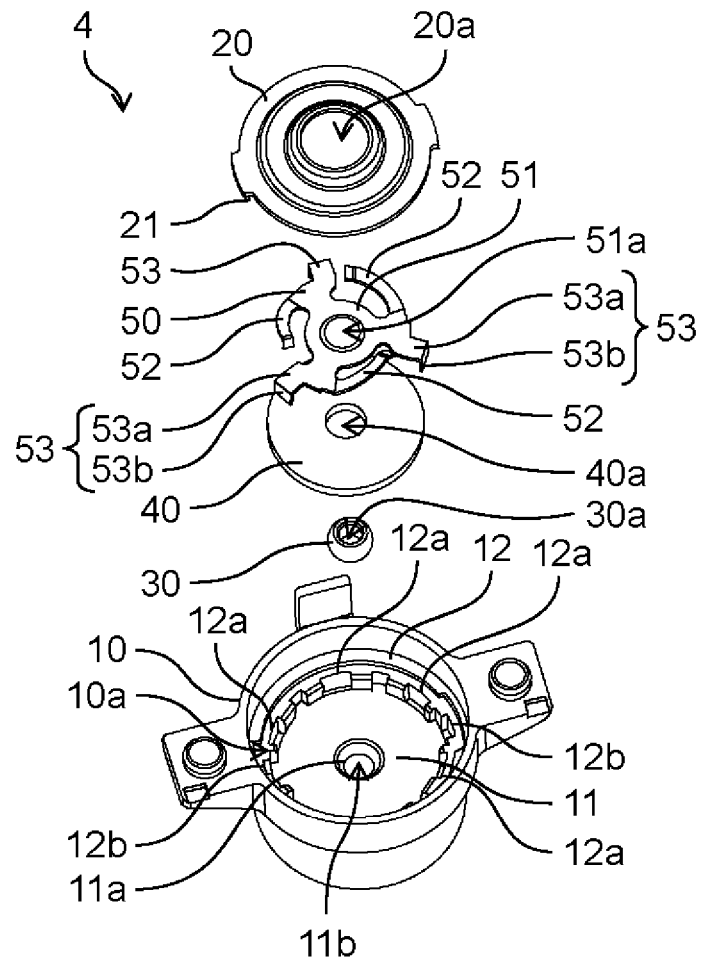
FIG. 6 is an exploded perspective view of the first bearing unit according to the exemplary embodiment.
Figure 7:
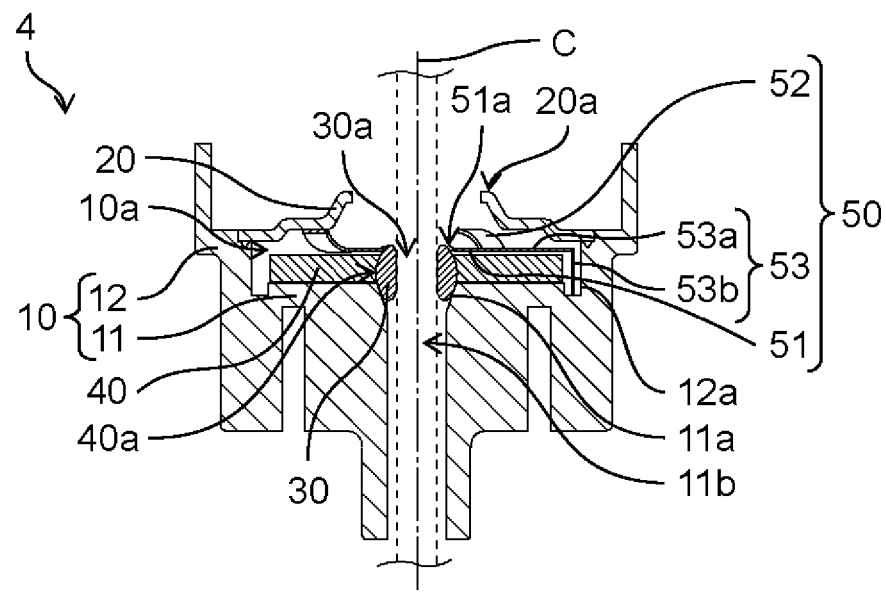
FIG. 7 is a cross-sectional view of the first bearing unit according to the exemplary embodiment.
Figure 8:
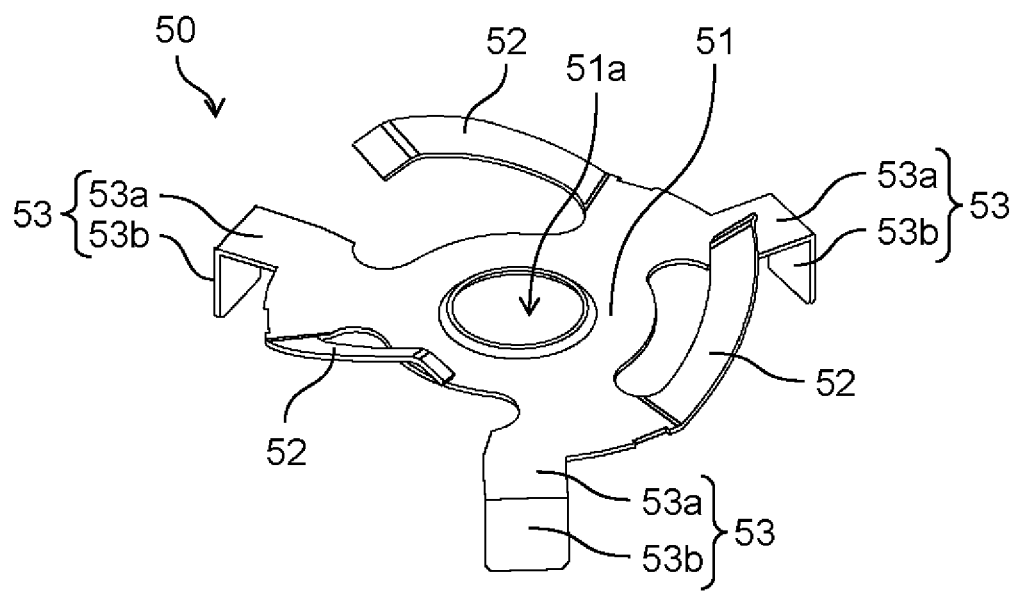
FIG. 8 is a perspective view of a pressing spring of the first bearing unit according to the exemplary embodiment when viewed from above.
Figure 9:
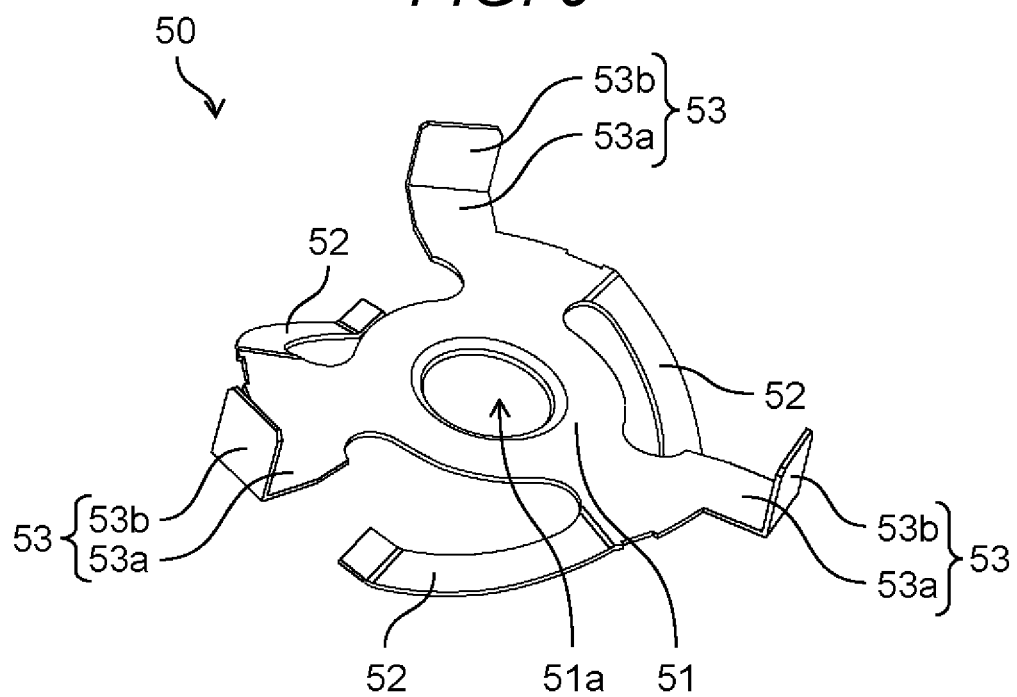
FIG. 9 is a perspective view of the pressing spring of the first bearing unit according to the exemplary embodiment when viewed from below.

FIGS. 4 and 5 illustrate first bearing unit 4 in a state where frame cover 20 is removed. FIG. 4 is a perspective view of first bearing unit 4 according to the exemplary embodiment in the state where frame cover 20 is removed. FIG. 5 is a top view of first bearing unit 4 according to the exemplary embodiment in the state where frame cover 20 is removed. FIG. 6 is an exploded perspective view of first bearing unit 4 according to the exemplary embodiment. FIG. 7 is a cross-sectional view of first bearing unit 4 according to the exemplary embodiment. In addition, FIGS. 8 and 9 illustrate pressing spring 50 for use for first bearing unit 4. FIG. 8 is a perspective view of pressing spring 50 of first bearing unit 4 according to the exemplary embodiment when viewed from above. FIG. 9 is a perspective view of pressing spring 50 of first bearing unit 4 according to the exemplary embodiment when viewed from below.

As illustrated in FIGS. 4 to 7, first bearing unit 4 includes frame 10, frame cover 20, bearing 30, oil filling member 40, and pressing spring 50. As illustrated in FIG. 7, bearing 30, oil filling member 40, and pressing spring 50 are disposed in frame 10. In other words, bearing 30, oil filling member 40, and pressing spring 50 are housed in frame 10.

As illustrated in FIGS. 4 and 6, frame 10 is a housing made of a bottomed tubular member having opening 10a. Frame 10 has bottom 11 and tubular body 12. Bottom 11 is formed so as to cover one opening of tubular body 12. Tubular body 12 is an outer peripheral wall of frame 10. Tubular body 12 has a cylindrical shape as a whole. An inner surface and an outer surface of tubular body 12 have cylindrical surfaces. Bottom 11 has a bottom surface having a circular shape.

As illustrated in FIGS. 4 and 6, frame cover 20 is a lid body disposed so as to cover opening 10a of frame 10. As illustrated in FIG. 7, frame cover 20 is fixed to frame 10. Insertion hole 20a through which rotating shaft 3a is inserted is formed in frame cover 20. Frame cover 20 is formed such that a central part thereof protrudes outward. However, the present disclosure is not limited thereto.

Frame 10 and frame cover 20 are outer members constituting an outer block of first bearing unit 4. Frame 10 and frame cover 20 are resin molded articles made of an insulating resin material. Frame 10 and frame cover 20 are not limited to resin components. Frame 10 and frame cover 20 may be metal components made of a metal material.

As illustrated in FIG. 3, bearing 30 is a member that rotatably supports rotating shaft 3a. As illustrated in FIGS. 6 and 7, through hole 30a through which rotating shaft 3a is inserted is formed in bearing 30. Bearing 30 is a sliding bearing. Specifically, bearing 30 is a sleeve bearing that is a sliding bearing having through hole 30a through which rotating shaft 3a is inserted. Bearing 30 is a metal body made of a copper alloy such as brass or a metal material such as iron.

Bearing 30 has a substantially ball shape as a whole. Bearing 30 has a shape bulging in the direction (lateral) orthogonal to the direction in which shaft center C included in rotating shaft 3a extends. Specifically, a shape of a side peripheral surface of bearing 30 is a convex spherical surface protruding laterally. As an example, an outer size of bearing 30 is φ6 mm. The shape of bearing 30 is not limited thereto.

As illustrated in FIGS. 6 and 7, recess 11a in which bearing 30 is disposed is provided in the central part of bottom 11 of frame 10. Recess 11a is a bearing seat on which bearing 30 is placed. Specifically, recess 11a has a shape recessed from the bottom surface of bottom 11 of frame 10 so as to be able to receive a lower part of bearing 30. As an example, recess 11a is formed so as to be able to house about a half of a lower half of bearing 30. Accordingly, as illustrated in FIG. 7, more than half of bearing 30 housed in recess 11a protrudes from recess 11a.

The shape of the inner surface of recess 11a is not particularly limited as long as at least a part of the lower part of bearing 30 can be housed. However, the shape of the inner surface of recess 11a is preferably the same as a shape of an outer peripheral surface of bearing 30. For example, when the side peripheral surface of bearing 30 is a convex spherical surface, the inner surface of recess 11a is preferably a concave spherical surface. The shape of the inner surface of recess 11a may be a tapered shape corresponding to the convex spherical surface formed by the side peripheral surface of bearing 30. With such a configuration, bearing 30 is housed in recess 11a in a state where the lower part of bearing 30 is fitted in recess 11a.

As illustrated in FIG. 3, rotating shaft 3a penetrates first bearing unit 4. Specifically, rotating shaft 3a penetrates bottom 11 of frame 10. Accordingly, as illustrated in FIG. 7, bottom 11 is provided with through hole 11b for causing rotating shaft 3a to penetrate therethrough. Specifically, through hole 11b is provided in recess 11a. In this case, bearing 30 disposed in recess 11a does not pass through through hole 11b. Specifically, bearing 30 has an outermost diameter larger than a diameter of through hole 11b of frame 10. The diameter of through hole 11b of frame 10 is preferably larger than a diameter of through hole 30a of bearing 30. If there is a gap between through hole 11b of frame 10 and rotating shaft 3a, even when rotating shaft 3a is slightly inclined, assembling work can be performed without deteriorating quality.

As shown in FIGS. 3 and 7, oil filling member 40 is disposed in frame 10. Oil filling member 40 is a member that supplies oil for bearing 30. Specifically, oil filling member 40 holds oil and supplies the oil to bearing 30. The oil contained in oil filling member 40 is a lubricating oil for smoothly rotating, with respect to bearing 30, rotating shaft 3a inserted through through hole 30a of bearing 30. The oil contained in oil filling member 40 is supplied to an interface between bearing 30 and rotating shaft 3a. When oil is supplied from oil filling member 40 to bearing 30 in this manner, an oil film (lubricating film) is generated at the interface between bearing 30 and rotating shaft 3a by the rotation of rotating shaft 3a, so that frictional resistance between rotating shaft 3a and bearing 30 is reduced. As long as oil filling member 40 contains oil, the oil contained in oil filling member 40 continues to be supplied to bearing 30. Oil filling member 40 is felt in which oil is immersed. Oil filling member 40 has a circular outer shape.

As shown in FIG. 7, oil filling member 40 is disposed in a manner of surrounding bearing 30. Specifically, oil filling member 40 is provided with through hole 40a. Bearing 30 is disposed in through hole 40a of oil filling member 40. Oil filling member 40 is in contact with bearing 30. Specifically, an inner surface of through hole 40a of oil filling member 40 is in contact with an outer peripheral surface of bearing 30.

Oil filling member 40 is disposed on bottom 11 of frame 10. In this case, oil filling member 40 is placed on bottom 11 of frame 10 so that through hole 40a and through hole 11b of frame 10 communicate with each other. Accordingly, bearing 30 is housed in a concave formed by communication between through hole 40a of oil filling member 40 and through hole 11b of frame 10. Bearing 30 housed in the concave has an upper part protruding from oil filling member 40. In other words, oil filling member 40 surrounds bearing 30 such that the upper part of bearing 30 is exposed. Oil filling member 40 need only have a thickness approximately half a thickness of bearing 30. An upper side of bearing 30 is preferably less exposed than a lower side of bearing 30.

Movement of oil filling member 40 in a horizontal direction (i.e., an in-plane direction of the bottom surface of bottom 11 of frame 10) is restricted by abutting on an inner surface of frame 10 or an inner surface of frame cover 20. An outer peripheral end surface of oil filling member 40 is opposed to the inner surface of frame cover 20. Thus, the movement of oil filling member 40 in the horizontal direction is restricted by frame cover 20.

As shown in FIG. 7, bearing 30 housed in the concave formed by the communication between through hole 40a of oil filling member 40 and through hole 11b of frame 10 is pressed by pressing spring 50 and held. Pressing spring 50 is an example of an elastic member that holds bearing 30. Bearing 30 is elastically held by the elastic force of pressing spring 50. Pressing spring 50 is a plate spring made of a metal plate. Accordingly, bearing 30 is energized by the spring elastic force of pressing spring 50. Pressing spring 50 is a component formed by processing one metal plate.

Pressing spring 50 is disposed above bearing 30. Specifically, pressing spring 50 is placed on oil filling member 40 in a manner of pressing the upper part of bearing 30 exposed from through hole 40a of oil filling member 40.

As illustrated in FIGS. 8 and 9, pressing spring 50 has plate-shaped main body 51 provided with through hole 51a. As illustrated in FIG. 7, pressing spring 50 is placed on the upper part of bearing 30 such that an inner peripheral edge of through hole 51a rides on the side peripheral surface of the upper part of bearing 30. In this case, an upper surface of bearing 30 on which pressing spring 50 is placed is exposed from through hole 51a of pressing spring 50. Specifically, through hole 51a of pressing spring 50 has a diameter larger than the diameter of through hole 30a of bearing 30. Thus, through hole 30a of bearing 30 is exposed from through hole 51a of pressing spring 50.

Main body 51 is a plate-shaped body located at a central part of pressing spring 50. Main body 51 is in contact with bearing 30. Specifically, the inner peripheral edge of through hole 51a of main body 51 is in contact with the side peripheral surface of the upper part of bearing 30. Main body 51 is opposed to the bottom surface of bottom 11 of frame 10 via oil filling member 40. In other words, oil filling member 40 is disposed between main body 51 of pressing spring 50 and bottom 11 of frame 10.

Pressing spring 50 is pressed by frame cover 20 fixed to frame 10 to press bearing 30. Accordingly, pressing spring 50 has the spring elastic force in the direction of shaft center C included in rotating shaft 3a.

Specifically, pressing spring 50 includes plate spring part 52 on which the spring elastic force acts in the direction in which shaft center C included in rotating shaft 3a extends. As illustrated in FIGS. 8 and 9, plate spring part 52 is a metal piece formed in a manner of cutting and raising a part of the metal plate constituting pressing spring 50.

Pressing spring 50 includes a plurality of plate spring parts 52. The plurality of plate spring parts 52 are provided at equal intervals along the rotation direction (circumferential direction) of rotating shaft 3a. Specifically, three plate spring parts 52 are provided in pressing spring 50. Each of three plate spring parts 52 is curved and extends along the rotation direction (circumferential direction) of rotating shaft 3a. Three plate spring parts 52 are formed in a manner of partially cutting and raising main body 51. Each plate spring part 52 is inclined so as to rise from a base part toward a distal end. Each plate spring part 52 is energized by abutting of the distal end on the inner surface of frame cover 20. As a result, the spring elastic force (spring restoring force) is generated at each plate spring part 52. Accordingly, bearing 30 is elastically held by the pressing of pressing spring 50 by the spring elastic force.

As illustrated in FIGS. 4 to 7, pressing spring 50 has protrusion 53 (protruding structure) protruding toward the inner surface of tubular body 12 of frame 10. Protrusion 53 functions as a positioning part that determines a position of pressing spring 50 by abutting on the inner surface of tubular body 12. In other words, when protrusion 53 abuts on the inner surface of tubular body 12 of frame 10, movement of pressing spring 50 in the in-plane direction of the bottom surface of bottom 11 of frame 10 is restricted, so that pressing spring 50 is disposed at a predetermined position.

Protrusion 53 and the inner surface of tubular body 12 are preferably close to each other. In this case, there may be a slight gap between protrusion 53 and the inner surface of tubular body 12, or there may be no gap between protrusion 53 and the inner surface of tubular body 12, and protrusion 53 and the inner surface of tubular body 12 may be in constant contact with each other. Note that in consideration of good assemblability of pressing spring 50, a gap of about 1 mm or less is preferably present between protrusion 53 and the inner surface of tubular body 12.

As illustrated in FIGS. 5, 8, and 9, pressing spring 50 has a plurality of protrusions 53. In this case, the plurality of protrusions 53 are better provided at equal intervals in the rotation direction of rotating shaft 3a. In the present exemplary embodiment, three protrusions 53 are provided in pressing spring 50. Three protrusions 53 are provided at equal intervals in the rotation direction of rotating shaft 3a. In other words, three protrusions 53 are provided at intervals of 120 degrees.

Each of the plurality of protrusions 53 has a bent structure formed by bending a plate-shaped piece. Specifically, each protrusion 53 is formed by bending a part of a plate-shaped piece protruding from main body 51 toward tubular body 12 of frame 10 by 90 degrees. In other words, each protrusion 53 has a shape obtained by bending a plate-shaped piece into an L shape.

Specifically, each protrusion 53 has first plate part 53a protruding toward the inner surface of tubular body 12 included in frame 10, and a second plate part 53b extending along the inner surface of tubular body 12 from a distal end of first plate part 53a. Further, as illustrated in FIG. 7, second plate part 53b extends in the direction of shaft center C of rotating shaft 3a. Second plate part 53b extends from the distal end of first plate part 53a toward bottom 11 of frame 10.

First plate part 53a is a plate-shaped body that protrudes from main body 51 in a direction parallel to the bottom surface of bottom 11 of frame 10. Second plate part 53b is a plate-formed body opposed to the inner surface of tubular body 12 of frame 10. Second plate part 53b is provided in an attitude of standing on first plate part 53a.

As illustrated in FIGS. 4 to 6, first groove 12a into which second plate part 53b of protrusion 53 is fitted is provided on the inner surface of tubular body 12 of frame 10. First groove 12a functions as a storage part that stores second plate part 53b of protrusion 53. First groove 12a is formed to be recessed in a thickness direction of tubular body 12.

In the present exemplary embodiment, three protrusions 53 are provided in pressing spring 50. Thus, first groove 12a is provided corresponding to each of second plate parts 53b of three protrusions 53. Accordingly, at least three first grooves 12a are provided. As illustrated in FIG. 5, six first grooves 12a are provided at intervals of 60 degrees. Note that three second plate parts 53b are housed in three first grooves 12a of six first grooves 12a. Although first groove 12a has a groove width slightly larger than a plate width of second plate part 53b, it may be the same.

As illustrated in FIGS. 4 to 6, second groove 12b into which plate-shaped projection 21 of frame cover 20 is fitted is also provided on the inner surface of tubular body 12 of frame 10. In other words, second groove 12b functions as a storage part that stores projection 21. Similarly to first groove 12a, second groove 12b is formed to be recessed in the thickness direction of tubular body 12.

In the present exemplary embodiment, since frame cover 20 is provided with two projections 21, frame 10 is provided with two second grooves 12b corresponding to two projections 21, respectively. Two projections 21 of frame cover 20 are provided so as to be opposed to each other at an interval of 180 degrees. This makes two second grooves 12b be provided so as to be opposed to each other at an interval of 180 degrees as well. Although second groove 12b has a groove width slightly larger than a width of projection 21, it may be the same.

As described above, on the inner surface of tubular body 12 of frame 10, a plurality of grooves including six first grooves 12a and two second grooves 12b are repeatedly formed along the rotation direction of rotating shaft 3a. As a result, the inner surface of tubular body 12 has a gear-like uneven shape.

Figure 10:
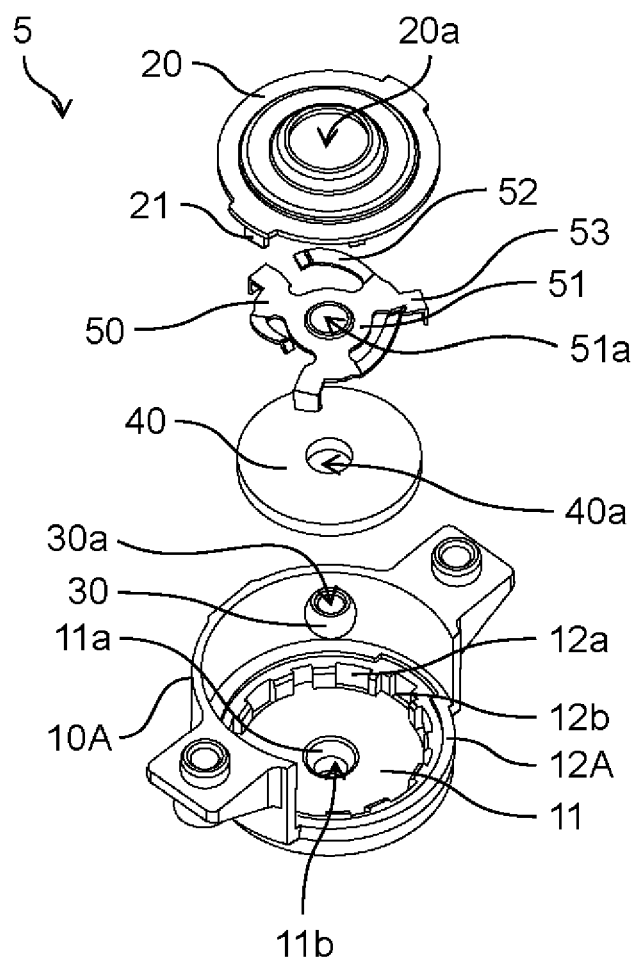
FIG. 10 is an exploded perspective view of a second bearing unit according to the exemplary embodiment.
Figure 11:
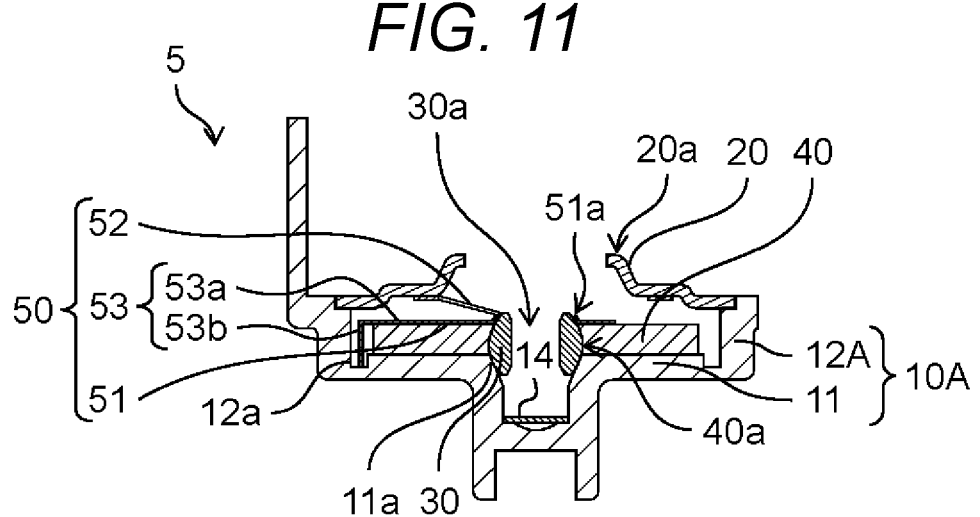
FIG. 11 is a cross-sectional view of the second bearing unit according to the exemplary embodiment.

Next, second bearing unit 5 according to the exemplary embodiment will be described with reference to FIGS. 10 and 11. FIG. 10 is an exploded perspective view of second bearing unit 5. FIG. 11 is a cross-sectional view of second bearing unit 5.

As illustrated in FIGS. 10 and 11, similarly to first bearing unit 4, second bearing unit 5 includes frame 10A, frame cover 20, bearing 30, oil filling member 40, and pressing spring 50.

Second bearing unit 5 is different from first bearing unit 4 in a configuration of frame 10A. Specifically, while first bearing unit 4 is a unit through which rotating shaft 3a penetrates, second bearing unit 5 is a unit through which rotating shaft 3a does not penetrate. Therefore, as illustrated in FIG. 11, in second bearing unit 5, bottom 11 of frame 10A is not provided with such through hole 11b as is provided in first bearing unit 4. As illustrated in FIG. 10, in second bearing unit 5, a part of tubular body 12A of frame 10A is notched.

Second bearing unit 5 has the same configuration as first bearing unit 4 except that through hole 11b is not provided in bottom 11 of frame 10A, that thrust receiving plate 14 is inserted, and that the shape of frame 10A is different.

Next, effects of first bearing unit 4 and second bearing unit 5 of the present disclosure will be described in comparison with conventional bearing unit 4X. Since the effect of first bearing unit 4 and the effect of second bearing unit 5 are the same, only the effect of first bearing unit 4 will be described below.

Figure 12:
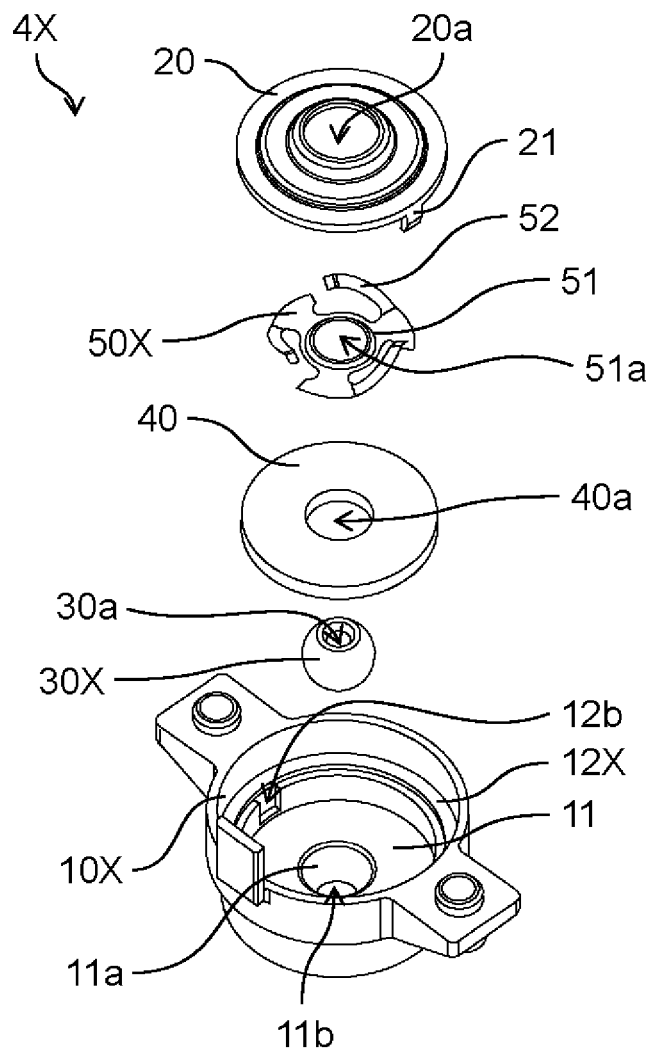
FIG. 12 is an exploded perspective view of a conventional bearing unit.
Figure 13:
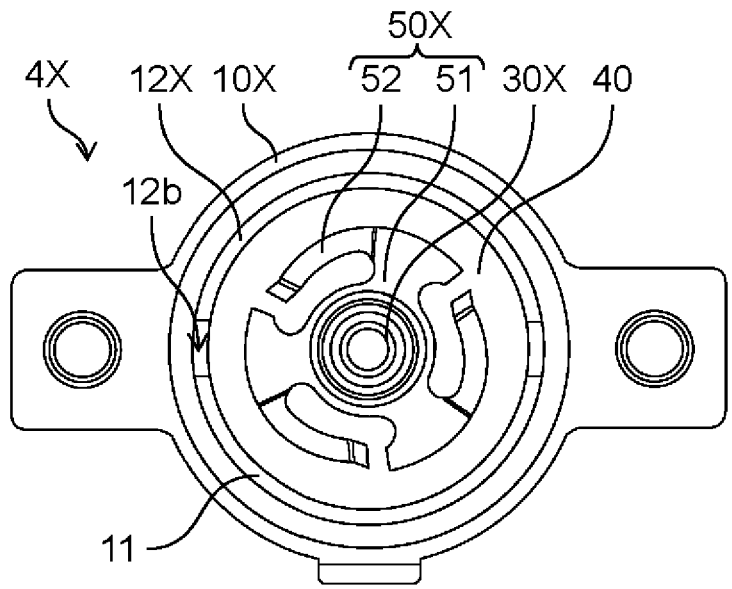
FIG. 13 is a top view of the conventional bearing unit in a state where a frame cover is removed.

A configuration of conventional bearing unit 4X will be described with reference to FIGS. 12 and 13. FIG. 12 is an exploded perspective view of conventional bearing unit 4X. FIG. 13 is a top view of conventional bearing unit 4X in a state where frame cover 20 is removed.

As illustrated in FIGS. 12 and 13, conventional bearing unit 4X includes frame 10X, frame cover 20, bearing 30X, oil filling member 40, and pressing spring 50X, similarly to first bearing unit 4.

Conventional bearing unit 4X is different from first bearing unit 4 in configurations of pressing spring 50X, frame 10X, and bearing 30X.

Specifically, in first bearing unit 4, pressing spring 50 is provided with protrusions 53. Note that in conventional pressing spring 50X, a protrusion corresponding to protrusion 53 is not provided in pressing spring 50X.

In first bearing unit 4, tubular body 12 of frame 10 is provided with first groove 12a. However, in conventional pressing spring 50X, tubular body 12X of frame 10X is not provided with a groove corresponding to first groove 12a.

Bearing 30X of conventional bearing unit 4X is larger in outer size than bearing 30 of first bearing unit 4. Specifically, the outer size of bearing 30 of first bearing unit 4 is φ6 mm, for example. Bearing 30X of conventional bearing unit 4X has the outer size of φ9 mm. Therefore, through hole 51a of main body 51 of pressing spring 50X in conventional bearing unit 4X is larger than through hole 51a of main body 51 of pressing spring 50 in first bearing unit 4.

Conventional bearing unit 4X and first bearing unit 4 have the same configuration except for a shape of pressing spring 50X, a shape of frame 10X, and the outer size of bearing 30X.

In thus configured conventional bearing unit 4X, pressing spring 50X may be deviated from a predetermined position and placed on bearing 30X when bearing unit 4X is assembled. Specifically, as illustrated in FIG. 13, there may be a large gap between an outer peripheral edge of main body 51 of pressing spring 50X and an inner surface of tubular body 12X of frame 10X, and pressing spring 50X may be deviated in a direction parallel to the bottom surface of bottom 11 of frame 10X, or pressing spring 50X may be inclined as a result of the deviation.

On this occasion, bearing unit 4X may be assembled while pressing spring 50X is deviated from the predetermined position. In this case, pressing spring 50X disposed to be deviated from the predetermined position is pressed by frame cover 20. As a result, pressing spring 50X might not be able to apply desired pressing to bearing 30X. For example, when bearing unit 4X is assembled with pressing spring 50X being deviated from the predetermined position, a direction of pressing of pressing spring 50X to bearing 30X may be deviated from a predetermined direction, or bearing 30X may be pressed by excessive pressing from pressing spring 50X. As a result, pressing spring 50X cannot elastically hold bearing 30X in a desired state, so that bearing 30X may fail to exhibit an alignment function.

In particular, in a case where bearing 30X is downsized, for example, when the outer size of bearing 30X is changed from φ9 mm to φ6 mm, pressing spring 50X becomes unstable on bearing 30X. As a result, it is more difficult to place pressing spring 50X at a correct position above bearing 30X, so that pressing spring 50X is easily deviated in position. In other words, when bearing 30X is downsized, a possibility that bearing 30X cannot exhibit the alignment function is further increased.

Therefore, as a result of intensive studies by the inventor of the present application, it has been found that it is possible to suppress deviation of pressing spring 50 from a predetermined position by devising the shape of pressing spring 50.

Specifically, in first bearing unit 4 according to the present exemplary embodiment, pressing spring 50 has the positioning part that determines the position of pressing spring 50 by abutting on the inner surface of tubular body 12 of frame 10. In the present exemplary embodiment, pressing spring 50 has, as the positioning part, protrusion 53 protruding toward the inner surface of tubular body 12. In other words, in first bearing unit 4, the position of pressing spring 50 is determined by protrusion 53 abutting on the inner surface of tubular body 12.

In this manner, the position of pressing spring 50 is determined as a result of contact with bearing 30 and with the inner surface of tubular body 12 included in frame 10. Main body 51 at the center of pressing spring 50 comes into contact with bearing 30, and in addition, protrusion 53 comes into contact with the inner surface of tubular body 12 of frame 10, thus the position of pressing spring 50 in frame 10 is determined.

With this configuration, the position of the pressing spring 50 is accurately determined with high precision without relying on a positioning method of simply disposing main body 51 provided with through hole 51a at the center above the upper part of bearing 30. As a result, bearing 30 can be correctly held by pressing spring 50. As described above, according to first bearing unit 4 of the present exemplary embodiment, pressing spring 50 can be easily disposed at a predetermined position. In other words, in the work of attaching pressing spring 50, pressing spring 50 can be accurately positioned. Therefore, it is possible to suppress a situation from occurring where pressing spring 50 is disposed while being deviated from a predetermined position, bearing 30 cannot exhibit the alignment function.

In particular, as described above, when a small bearing is used, positional deviation of the pressing spring is likely to occur. However, by using pressing spring 50 having protrusion 53 as in first bearing unit 4, it is possible to effectively suppress pressing spring 50 from deviating in position even in a case where small bearing 30 is used. Consequently, pressing spring 50 can be easily disposed at a predetermined position.

In first bearing unit 4, a plurality of protrusions 53 of pressing spring 50 are provided.

As a result, since pressing spring 50 and tubular body 12 of frame 10 abut on each other at a plurality of places, pressing spring 50 can be more easily disposed at a predetermined position.

In the present exemplary embodiment, three protrusions 53 are provided in pressing spring 50.

As a result, there are three contact places between pressing spring 50 and tubular body 12 of frame 10. Therefore, pressing spring 50 can be supported at three points with respect to frame 10. Consequently, pressing spring 50 can be stably disposed at a predetermined position.

The plurality of protrusions 53 in pressing spring 50 are provided at equal intervals along the rotation direction of rotating shaft 3a.

This enables pressing spring 50 to be disposed at a predetermined position in a more stable state.

In first bearing unit 4, protrusion 53 includes first plate part 53a protruding toward the inner surface of tubular body 12 included in frame 10, and second plate part 53b extending along the inner surface of tubular body 12 from the distal end of first plate part 53a, second plate part 53b being opposed to the inner surface of tubular body 12.

With this configuration, protrusion 53 of pressing spring 50 can have a bent structure. Therefore, it is possible to impart a spring property to protrusion 53.

In first bearing unit 4, the inner surface of tubular body 12 of frame 10 is provided with first groove 12a into which second plate part 53b of pressing spring 50 is fitted.

With this configuration, movement of rotating shaft 3a in the rotation direction at second plate part 53b can be restricted by first groove 12a. Accordingly, it is possible to prevent pressing spring 50 from rotating in the rotation direction of rotating shaft 3a. In other words, first groove 12a functions as an anti-rotation structure of pressing spring 50. This enables pressing spring 50 to be disposed at a predetermined position in a more stable state.

Moreover, when first bearing unit 4 is assembled, by inserting second plate part 53b of protrusion 53 in pressing spring 50 into first groove 12a, pressing spring 50 is disposed in frame 10. On this occasion, first groove 12a functions as a guide when second plate part 53b is inserted. This enables an assembly worker to smoothly perform positioning work of pressing spring 50.

In first bearing unit 4, bearing 30 is disposed in through hole 40a of oil filling member 40 disposed in frame 10.

Since with this configuration, oil can be supplied to bearing 30 by oil filling member 40, frictional resistance between bearing 30 and rotating shaft 3a can be reduced. Thus, the life of first bearing unit 4 can be extended. In other words, the life of motor 1 can be extended.

As described in the foregoing, first bearing unit 4 of the present exemplary embodiment is a bearing unit that supports rotating shaft 3a, and includes: frame 10 including tubular body 12; bearing 30 disposed in frame 10; and pressing spring 50 that is disposed in frame 10 and presses bearing 30. Pressing spring 50 has a positioning part that comes into contact with the inner surface of tubular body 12 to determine the position of pressing spring 50.

As a result, since pressing spring 50 can be easily disposed at a predetermined position, it is possible to suppress a situation from occurring where bearing 30 cannot exhibit the alignment function.

The positioning part may be one or more protrusions 53 protruding toward the inner surface of tubular body 12.

A plurality of protrusions 53 may be provided.

Three protrusions 53 may be provided.

The plurality of protrusions 53 may be provided at equal intervals along the rotation direction of rotating shaft 3a.

Protrusion 53 may have a first plate part protruding toward the inner surface of tubular body 12, and second plate part 53b extending along the inner surface of tubular body 12 from the distal end of first plate part 53a. Second plate part 53b may be opposed to the inner surface of tubular body 12.

A groove into which second plate part 53b is fitted may be provided on the inner surface of tubular body 12.

Oil filling member 40 disposed in frame 10 may be provided, through hole 30a may be formed in oil filling member 40, and bearing 30 may be disposed in through hole 30a.

As described in the foregoing, motor 1 according to the present exemplary embodiment includes the bearing unit, and rotating shaft 3a supported by the bearing unit. This enables motor 1 to have a longer life.

(Modifications)

The bearing unit and the motor according to the present disclosure have been described in the foregoing based on the exemplary embodiment. Note that the present disclosure is not limited to the exemplary embodiment above.

Figure 14:
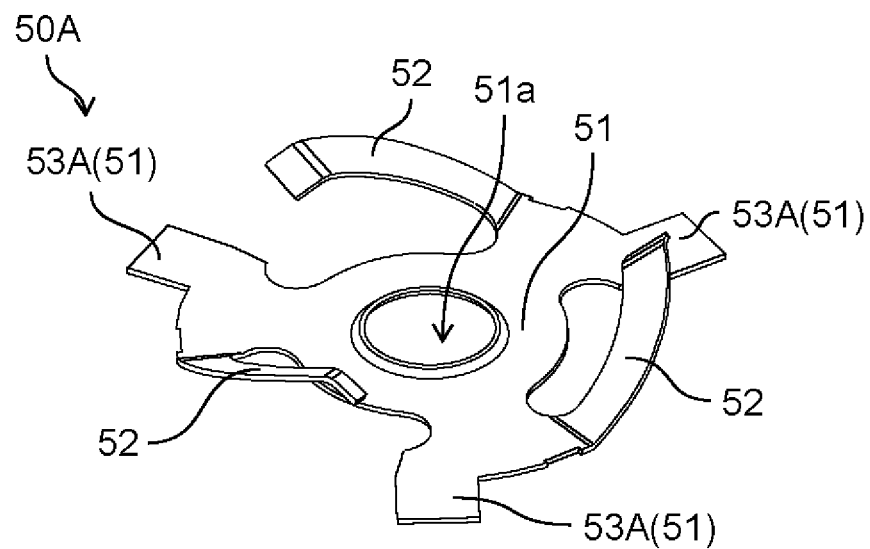
FIG. 14 is a perspective view of a pressing spring according to a modification.

Specifically, in the above-described exemplary embodiment, protrusion 53 of pressing spring 50 has a bent structure in which a plate-shaped piece is bent. However, the present disclosure is not limited thereto. For example, as in pressing spring 50A illustrated in FIG. 14, each protrusion 53A may have a structure in which a plate-shaped piece is not bent. FIG. 14 is a perspective view of pressing spring 50A according to a modification. Specifically, each protrusion 53A of pressing spring 50A illustrated in FIG. 14 does not have a plate part corresponding to second plate part 53b, but includes only a plate part corresponding to first plate part 53a out of first plate part 53a and second plate part 53b.

Figure 15:
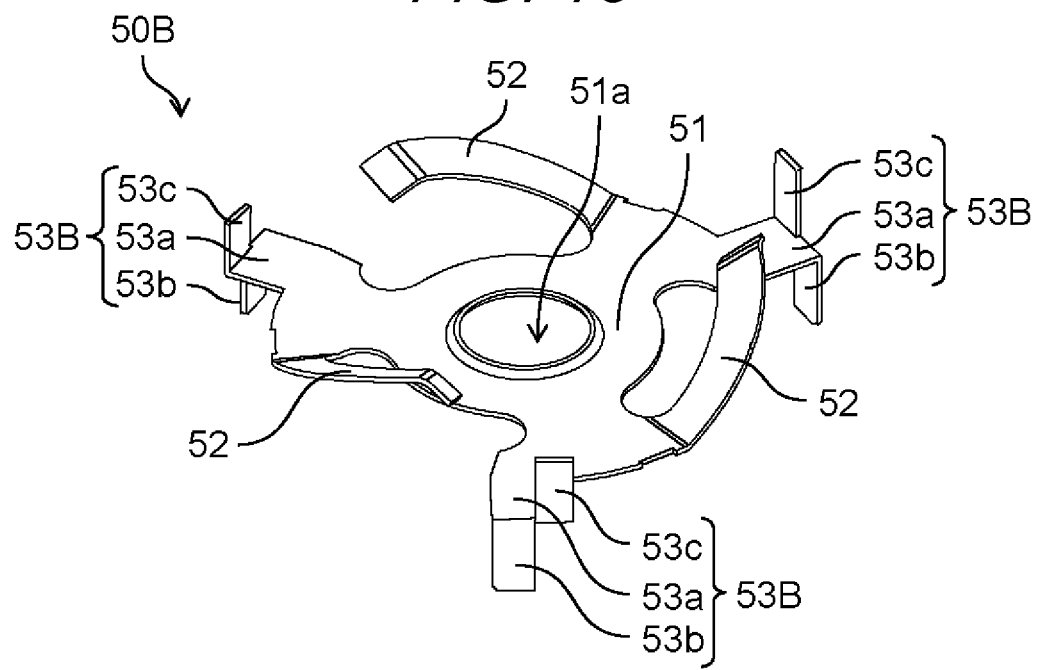
FIG. 15 is a perspective view of a pressing spring according to another modification.

In the above-described exemplary embodiment, protrusion 53 of pressing spring 50 has a shape bent from the distal end of first plate part 53a only in one direction along shaft center C included in rotating shaft 3a so as to have an L shape. However, the present disclosure is not limited thereto. For example, as in pressing spring 50B illustrated in FIG. 15, each protrusion 53B may have a shape bent in both directions along shaft center C included in rotating shaft 3a from the distal end of first plate part 53a. FIG. 15 is a perspective view of pressing spring 50B according to a modification. Specifically, in pressing spring 50B illustrated in FIG. 15, each protrusion 53B has third plate part 53c in addition to first plate part 53a and second plate part 53b. In each protrusion 53B, third plate part 53c is bent at 90 degrees to the side opposite to second plate part 53b.

In the above exemplary embodiment, a small sliding bearing having the diameter of φ6 mm is used as bearing 30. However, the present disclosure is not limited thereto. For example, a sliding bearing having a diameter of φ9 mm may be used as bearing 30.

In the above exemplary embodiment, motor 1 includes mold resin 6. However, the technology of the present disclosure can be also applied to a motor not including mold resin 6.

Motor 1 in the present exemplary embodiment has been described as a motor that can be used as a blower for cooling. However, the present disclosure is not limited to this. Motor 1 can be used for various electric apparatuses.

In addition, the present disclosure includes other embodiments obtained by making various modifications conceived by a person of ordinary skill in the art to the above exemplary embodiment, or other embodiments achieved by any combination of the constituent elements and functions in the exemplary embodiment without departing from the spirit of the present disclosure.

The technology of the present disclosure can be used for various electric apparatuses having a structure for supporting a rotating shaft, such as a motor and a blower.

The invention claimed is:

1. A bearing unit that supports a rotating shaft, the bearing unit comprising:
   a frame including a tubular body;
   a bearing disposed in the frame; and
   a pressing spring that is disposed in the frame and presses the bearing, the pressing spring including a positioning part that comes into contact with an inner surface of the tubular body to determine a position of the pressing spring, wherein:
   the positioning part comprises one or more protrusions protruding toward the inner surface of the tubular body,
   each of the one or more protrusions includes a first plate part protruding toward the inner surface of the tubular body and a second plate part extending along the inner surface of the tubular body from a distal end of the first plate part, the second plate part being opposed to the inner surface of the tubular body,
   a groove, into which the second plate part is fitted, is provided on the inner surface of the tubular body,
   the groove comprises an opening into which the second plate part is inserted, and a pair of side walls facing each other across the opening, and
   the pair of side walls face the second plate part and restrict rotation of the second plate part in a rotational direction of the rotating shaft.

2. The bearing unit according to claim 1, wherein the one or more protrusions comprise a plurality of protrusions are provided.

3. The bearing unit according to claim 2, wherein the plurality of protrusions comprise three protrusions.

4. The bearing unit according to claim 3, wherein the plurality of three protrusions are provided at equal intervals in the rotation direction of the rotating shaft.

5. The bearing unit according to claim 2, wherein the plurality of protrusions are provided at equal intervals in the rotation direction of the rotating shaft.

6. The bearing unit according to claim 1, further comprising an oil filling member disposed in the frame, wherein
   a through hole is formed in the oil filling member, and
   the bearing is disposed in the through hole.

7. A motor comprising:
   the bearing unit according to claim 1; and
   the rotating shaft supported by the bearing unit.

8. The bearing unit according to claim 1, further comprising:
   a frame cover covering a hollow portion of the tubular body, wherein
   the pressing spring has a plate-shaped main body and a plurality of plate spring parts, the main body being in contact with the bearing,
   the plate spring parts are formed in a manner of partially cutting and raising main body, and
   each of the plate spring parts is energized by abutting of a distal end on an inner surface of the frame cover.

* * * * *